Sept. 14, 1943. M. L. MOSHER 2,329,411
HEADER PLUG
Filed March 26, 1942
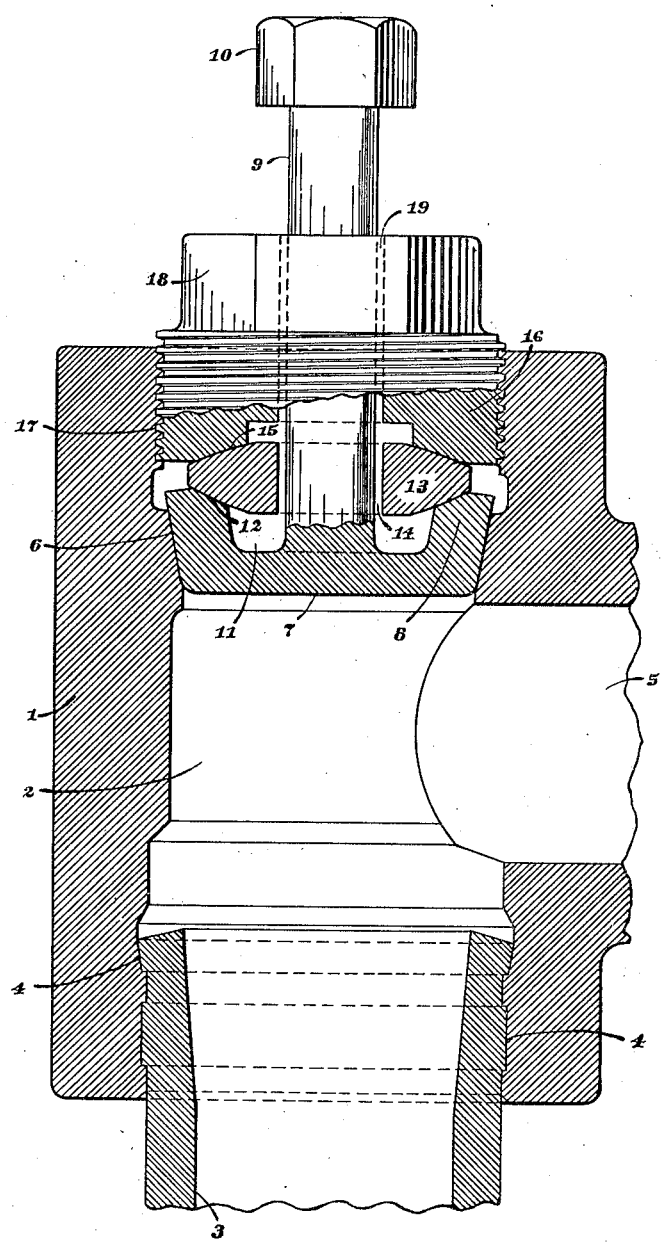
Attest
John G. Buty
Andrew T. Zodl
Inventor
Merritt L. Mosher
By Norbert E. Birch
Attorney Patented Sept. 14, 1943

2,329,411

UNITED STATES PATENT OFFICE 2,329,411

HEADER PLUG

Merritt L. Mosher, Philadelphia, Pa., assignor to The Atlantic Refining Company, Philadelphia, Pa., a corporation of Pennsylvania Application March 26, 1942, Serial No. 436,258

5 Claims. (Cl. 138—95)

The present invention relates to removable closures for furnace tube headers or return bends, and more particularly to improvements in plugs associated with tube headers utilized at high temperatures and pressures commonly encountered in oil cracking and refining operations.

An object of this invention is to provide an improved plug for tube headers adapted to be attached to the ends of adjacent tubes, the plug being so constructed that it will withstand the high temperatures and pressures to which it is subjected when in use, and at the same time provide a leak-proof joint.

A further object of this invention is to provide an improved plug for tube headers adapted to be readily inserted or removed from the header as necessity demands, the plug being so constructed as to adapt itself to the plug seat, irrespective of slight changes in the dimensions or shape of the seat which normally occur during use.

Other objects of the present invention will be readily apparent from the following description, reference being had to the accompanying drawing which shows a side sectional elevation of one embodiment of the invention.

Referring to the drawing, 1 represents the body of the tube header, recessed at 2 to accommodate the end of furnace tube 3 which is locked in place and sealed by expansion into grooves 4 of the header. Passage 5 communicates with the other half of the tube header corresponding to 1, which, being of identical construction, is not shown. The upper portion of the header body 1 is provided with a tapered plug seat 6 adapted to engage the tapered plug 7, such plug comprising a truncated conical body 8 provided with a stem 9 carrying a nut 10, and being counterbored or recessed at 11 to impart a certain degree of flexibility to the tapered side wall of the plug body. The upper inner margin of the plug is ground or machined to provide a bearing surface 12, preferably spherical or concave, for the thrust ring 13 which is apertured centrally at 14 to accommodate stem 9 of plug 7. The upper and lower surfaces of the thrust ring are ground or machined to conform substantially to the curvature of the bearing surface 12 of the plug, and the bearing surface 15 of the set collar 16, respectively. By utilizing a thrust ring having two spherical bearing surfaces, it is possible to obtain an excellent adjustment between the set collar 16 and the plug 7, and to equally distribute the pressure over the plug seat 6. The plug 7, being counterbored at 11 for flexibility, is more easily distortable than a solid plug, and readily accommodates itself to the shape and angle of the plug seat 6, thereby producing a tight seal.

The upper portion of the header body 1 is recessed and threaded at 17, and is adapted to engage the threaded portion of the set collar 16, the collar being provided at its upper periphery with a plurality of vertical, flat faces 18 to which a wrench or spanner may be applied for tightening. The set collar is further provided with a central recess or bore 19 through which the stem 9 of plug 7 projects.

In operation, the assembly comprising the plug 7, thrust ring 13, and the set collar 16 is inserted in the header body 1, the plug 7 engaging the plug seat 6. The set collar is screwed into position and tightened by means of a wrench or spanner applied to the flat faces 18 of the collar, the pressure due to tightening being transmitted through the thrust ring 13 to the sperical surface 12 of the plug body 8. Due to the spherical shape of the thrust ring surfaces and the upper inner margin of the wall of the plug, the pressure from the set collar is directed both downwardly and radially outwardly in such a manner that the plug 7 is fully seated, and the flexible walls of the plug are urged radially outwardly into tight contact with the plug seat 6, thus producing a leak-proof seal.

In the event that it becomes desirable to open the header 1 for inspection or cleaning of the interior surfaces of the tubes, the set collar 16 is unloosened by means of a wrench, thereby relieving the pressure upon the thrust ring 13 and the plug 7. The plug, if too firmly seated, may be loosened by light blows from a maul applied to the stem 9, and the plug assembly may thereafter be removed from the header body.

I claim:

1. In combination, a tube header body having an aperture therethrough provided with a tapered seat and a threaded portion extending from the wide end of said seat, a tapered plug engageable with said seat and recessed to provide a distortable side wall, the upper inner margin of which has a contour adapted to transmit pressure downwardly and radially outwardly, a thrust ring having upper and lower spherical surfaces, and a threaded collar adapted to engage the threaded portion of said header body, said collar having a lower inner portion with a contour adapted to engage the upper spherical surface of said thrust ring.

2. In combination, a tube header body having an aperture therethrough provided with a tapered seat and a threaded portion extending from the wide end of said seat, a tapered plug having a stem integral therewith and extending axially thereof, said plug being engageable with said seat and recessed to provide a distortable side wall, the upper inner margin of which has a contour adapted to transmit pressure downwardly and radially outwardly, a thrust ring centrally apertured to accommodate said stem and having upper and lower spherical surfaces, and a threaded collar adapted to engage the threaded portion of said header body, said collar being centrally recessed to accommodate said stem and having a lower inner portion with a contour adapted to engage the upper spherical surface of said thrust ring.

3. A removable closure for tube headers and the like, comprising a tapered plug having a stem integral therewith and extending axially thereof, said plug being recessed to provide a distortable side wall, the upper inner margin of which has a surface contour adapted to transmit pressure downwardly and radially outwardly, and a thrust ring overlying said plug having an under surface complementary to the surface contour of the upper inner margin of said wall, said ring being centrally apertured to accommodate said stem.

4. A removable closure for tube headers and the like comprising a tapered plug recessed to provide a distortable side wall, the upper inner margin of which has a surface contour adapted to transmit pressure downwardly and radially outwardly, a thrust ring overlying said plug having an under surface complementary to the surface contour of the upper inner margin of said side wall, and means operatively engageable with said thrust ring to distort said side wall.

5. A removable closure for tube headers and the like comprising a tapered plug recessed to provide a distortable side wall, the upper inner margin of which has a spherical surface adapted to transmit pressure downwardly and radially outwardly, a thrust ring having upper and lower spherical surfaces, the lower of said spherical surfaces being complementary to the spherical surface of the upper inner margin of said side wall, and screw means operatively engageable with said thrust ring to distort said side wall, said means having an under surface complementary to the upper spherical surface of said thrust ring.

MERRITT L. MOSHER.